(12) United States Patent
Hwang

(10) Patent No.: US 8,053,142 B2
(45) Date of Patent: Nov. 8, 2011

(54) NANOSTRUCTURED COMPOSITE ANODE WITH NANO GAS CHANNELS AND ATMOSPHERE PLASMA SPRAY MANUFACTURING METHOD THEREOF

(75) Inventor: Changsing Hwang, Longtan Township, Taoyuan County (TW)

(73) Assignee: Atomic Energy Council-Institute of Nuclear Energy Research, Taoyuan County (TW)

( * ) Notice: Subject to any disclaimer, the term of this patent is extended or adjusted under 35 U.S.C. 154(b) by 1189 days.

(21) Appl. No.: 11/606,206

(22) Filed: Nov. 30, 2006

(65) Prior Publication Data
US 2008/0131752 A1 Jun. 5, 2008

(51) Int. Cl.
*H01M 4/02* (2006.01)
(52) U.S. Cl. ...................................... 429/523
(58) Field of Classification Search .................. None
See application file for complete search history.

(56) References Cited

U.S. PATENT DOCUMENTS

| | | | | |
|---|---|---|---|---|
| 5,998,056 | A * | 12/1999 | Divisek et al. | 429/41 |
| 2003/0003348 | A1 * | 1/2003 | Hanket | 429/44 |
| 2006/0280998 | A1 * | 12/2006 | Ying et al. | 429/40 |
| 2007/0072035 | A1 * | 3/2007 | Korevaar et al. | 429/32 |
| 2008/0280166 | A1 * | 11/2008 | Kuzin et al. | 429/13 |

OTHER PUBLICATIONS

Nanostructured NiO/YSZ powder, Plasma Spray Grade 2004.*
Chen et al, air plasma spraying colloidial solutions of nanosized ceramic powders, 2004, journal of materials science, edition 39, pp. 4171-4176.*
Keech et al, synthesis and performance of sol gel prepared ni-YSZ cermet SOFC anodes, Feb. 1, 2005, journal of electrocheical society, edition 152, pp. a645-a651.*
Kek et al, electrical and microstructural investigations of cermet anode/YSZ thin film systems, 2001, journal of the european ceramic society, pp. 1861-1865.*

* cited by examiner

*Primary Examiner* — Melvin Mayes
*Assistant Examiner* — Stefanie Cohen
(74) *Attorney, Agent, or Firm* — Rosenberg, Klein & Lee

(57) ABSTRACT

A nanostructured composite anode with nano gas channel and an atmosphere plasma spray manufacturing method thereof are disclosed. The anode consists of a porous base material and a composite film with nano gas channels above the porous base material while the composite film has a plurality of nano gas pores and a plurality of nano gas channels. The manufacturing method according to the present invention includes the steps of: provide micron-sized agglomerated and nanostructured powders having mixture of nano oxide particles and a binder; heat the micron-sized agglomerated and nanostructured powders into melt or semi-melt oxide mixture; spray the melt or semi-melt oxide mixture on a porous base material; and generate the nanostructured anode composite film with nano gas channels through hydrogen reduction. The anode of the present invention increases the electrochemical activity and slows down nickel particle aggregation effect under high temperature environment.

22 Claims, 16 Drawing Sheets

NANOSTRUCTURED COMPOSITE ANODE WITH NANO GAS CHANNELS AND ATMOSPHERE PLASMA SPRAY MANUFACTURING METHOD THEREOF

BACKGROUND OF THE INVENTION

The present invention relates to a nanostructured composite anode and a manufacturing method thereof, especially to an anode composite film with nano gas channels and an atmosphere plasma spray manufacturing method thereof. The nanostructured composite anode with nano gas channel applied to solid oxide fuel cells effectively improves the electrochemical activity as well as conductivity of the anode and reduces the anode resistance. Moreover, the power loss caused by anode resistance is cut back and nickel particle aggregation effect on increasing anode resistance to an unfavorable condition under high-temperature operation environment is slowed down. Therefore, the lifetime of the anode is increased.

Solid oxide fuel cell is an electrochemical device that converts the chemical energy in gaseous fuels such as hydrogen and natural gas into electrical energy. Generally, typical SOFC systems employ yttria stabilized zirconia (YSZ) as an electrolyte, nickel-yttria stabilized zirconia cermet (YSZ//Ni) as an anode, and perovskite conducting oxides such as lanthanum manganites ($LaMnO_3$) as a cathode. Please refer to the following articles: Appleby, "Fuel cell technology: Status and future prospects," *Energy*, 21, 521, 1996; Singhal, "Science and technology of solid-oxide fuel cells," *MRS Bulletin*, 25, 16, 2000; Williams, "Status of solid oxide fuel cell development and commercialization in the U.S.," Proceedings of 6th International Symposium on Solid Oxide Fuel Cells (SOFC VI), Honolulu, Hi., 3, 1999; Hujismans et al., "Intermediate temperature sofc—a promise for the 21th century," *J. Power Sources*, 71, 107, 1998. The fuel cell needs to run at high temperatures—from 900 to 1000 Celsius degrees in order to achieve sufficiently oxygen conductivity and power output so that each material must have enough stability to endure fabrication and operation at high temperatures. Thus the manufacturing cost of such cells is quite high and it's difficult to do mass production of solid oxide fuel cells even such cells have high efficiency and low pollution.

Some electrolyte material has high oxygen conductivity at about 600° C. such as gadolinium-doped ceria (GDC). Compared with conventional technology, it's easier to use such electrolyte to manufacture fuel cell stack with lower cost. Along with decreasing of operation temperature, the reliability and lifetime of solid oxide fuel cells are dramatically improved and this further promotes applications of solid oxide fuel cells to vehicles or home use. However, when the operation temperature of solid oxide fuel cells falls into about 600° C., the electrochemical properties of electrodes decreases. This causes increasing of polarization resistance of anode and cathode. Thus besides new materials for the anode and the cathode such as LSCF($La_{0.6}Sr_{0.4}Co_{0.2}Fe_{0.8}O_3$) and Ni/GDC, improvement on microstructure of anode and cathode electrodes is required for a strong increase in the three-phase boundary so as to improve electrochemical activity and reduce power loss of the anode as well as the cathode.

There are a plurality of methods for manufacturing anodes of solid oxide fuel cells such as (1)chemical vapor deposition, (2)electrochemical vapor deposition, (3)sol-gel coating, (4)strip casting, (5) screen printing, (6) physical vaporous deosition and (7) plasma spray. The plasma spray includes atmosphere plasma spray (APS) and vacuum plasma spray (VPS). Among these methods, the manufacturing process of the atmosphere plasma spay is the fastest and has been received a lot of attentions.

Virkar has revealed a nanostructured YSZ/Ni cermet as anode for lower temperature and high power solid oxide fuel cells (Virkar, "Low-temperature anode-supported high power density solid oxide fuel cells with nanostructured electrodes," Fuel Cell Annual Report, 111, 2003). The YSZ/Ni cermet consists of thin micro-pore layer and thick macro-pore layer while diameters of micro-pores are as smaller as possible such as in nano-scale for effectively increasing numbers of the TPB (triple-phase-boundary). However, it is not described in detailed about the nanostructure of this thin micro-pore layer. In 2003, Chinese chemist Jin-Xia Wang has reported a cermet anode formed by nano-scale NiO and micro-scale YSZ mixture through hydrogen reduction. The solid oxide fuel cell with such anode has a higher output power (Wang, "Influence of size of NiO on the electrochemical properties for SOFC anode," *Chemical Journal of Chinese Universities*). In 2004, Liu also revealed nanostructured and functionally graded cathodes produced by Combustion Chemical Vapor Deposition (Liu, "Nanostructured and functionally graded cathodes for intermediate temperature solid oxide fuel cells," *J. Power Sources*, 138, 194, 2004). In such a structure, number of chemical reaction sites or TPB is increased so that the polarization resistance is significantly decreased. The energy loss is minimized. But on references, there is no one reported nanostructured anode having nano gas channels manufactured by atmosphere plasma spray method.

Under high operation temperature, nickel particle aggregation happens in the YSZ/Ni or GDC/Ni cermet anode and the resistance increases along with the enlargement of nickel particles. When the anode resistance is too high, the fuel cell works inefficiently and is given up.

Thus the present invention provides a nanostructured composite anode with nano gas channels and an atmosphere plasma spray manufacturing method thereof. The nanostructured composite anode with nano gas channels is made from nanoparticles and is able to slow down aggregation of nickel metal iron under high temperature environment. Thus electrochemical activity and lifetime of the anode are improved. Moreover, the nanostructured composite anode having nano gas pores and nano gas channels increases the TPB length and numbers of reaction sites so as to improve electrochemical activity of the SOFC anode. The nanostructured composite anode with nano gas pores and nano gas channels also increases conductivity of the anode and reduce energy loss from anode resistance.

SUMMARY OF THE INVENTION

Therefore it is a primary object of the present invention to provide a nanostructured composite anode with nano gas channels and an atmosphere plasma spray manufacturing method thereof that form a nanostructured anode composite film with nano gas pores and nano gas channels on porous base material by an atmosphere plasma spray. The nanostructured anode composite film with nano gas channels together with the porous base material forms an anode for solid oxide fuel cells. The nano gas pores and nano gas channels increase TPB (triple-phase-boundary) length of the anode so as to improve the electrochemical activity of the anode.

It is another object of the present invention to provide a nanostructured composite anode with nano gas channels and an atmosphere plasma spray manufacturing method thereof that form a nanostructured anode composite film with nano gas pores and nano gas channels on porous base material by an atmosphere plasma spray. The nanostructured anode composite film with nano gas channels together with the porous base material forms an anode for solid oxide fuel cells. The nanostructured anode with nano gas pores and nano gas channels increase conductivity of the anode and so reduce the anode resistance loss.

It is a further object of the present invention to provide a nanostructured composite anode with nano gas channels and an atmosphere plasma spray manufacturing method thereof that form a nanostructured composite film with nano gas channels on porous base material by an atmosphere plasma spray for slowing down nickel particle aggregation effect on the anode under high-temperature operation environment. Thus the lifetime of the anode is increased.

The nanostructured composite anode with nano gas channels according to the present invention includes a porous base material and a nanostructured composite film with nano gas channels above the porous base material. The nanostructured composite film has a plurality of nano gas pores and a plurality of nano gas channels. The atmosphere plasma spray manufacturing method for manufacturing the nanostructured composite anode with nano gas channels according to the present invention consists of the steps of: provide micron-sized agglomerated and nanostructured powders having mixture of nano oxide particles and a binder; heat the micron-sized agglomerated and nanostructured powders into melt or semi-melt oxide mixture; spray the melt or semi-melt oxide mixture on a porous base material; and generate the nanostructured composite anode with nano gas channels through hydrogen reduction.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
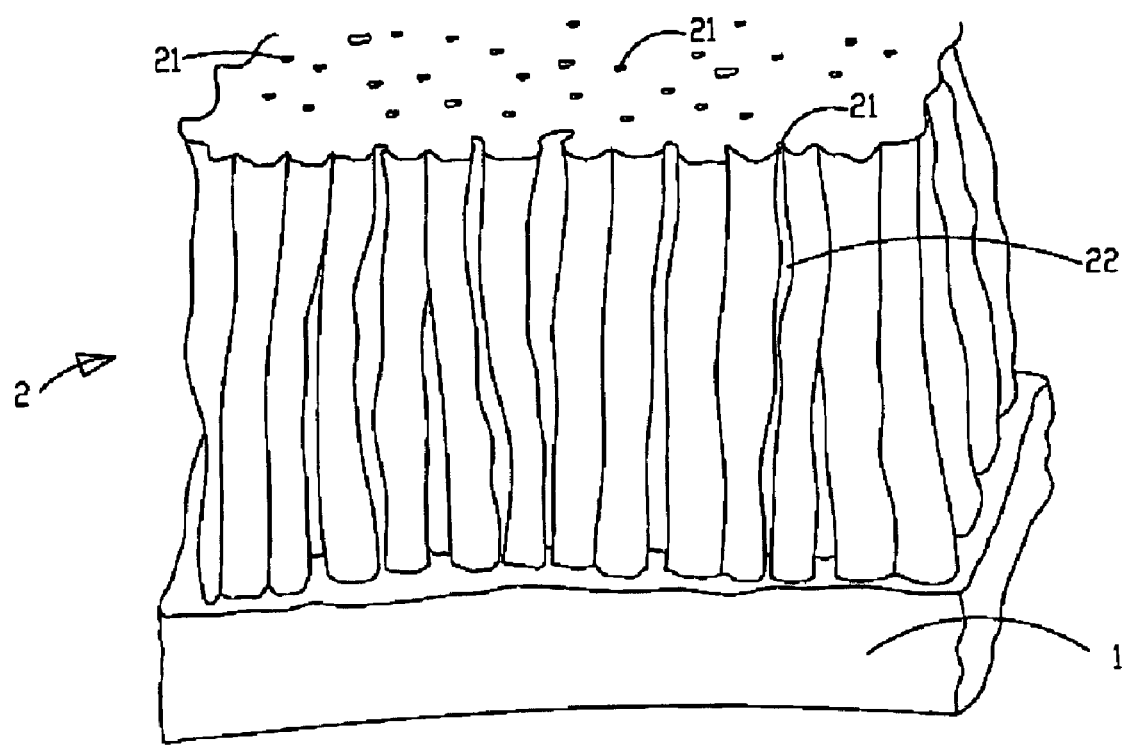
FIG. 1 is a schematic drawing of a nanostructured composite anode with nano gas channels according to the present invention.

Refer to FIG. 1, a nanostructured composite anode with nano gas channel according to the present invention includes a porous base material 1 and a composite film with nano gas channels. The composite film having a plurality of nano gas pores 21 and a plurality of nano gas channels 22 is disposed above the porous base material 1.

The porous base material 1 is made from porous yttria stabilized zirconia/nickel (YSZ/Ni) composite material, porous nickel, porous stainless steel, porous iron-nickel alloy or porous iron-chromium alloy. The porous base material 1 is conductive and gas permeable material with thickness ranging from 0.5 mm to 2 mm. The nanostructured composite film with nano gas channels 2 is made from yttria-stabilized zirconia/nickel nano composite film or Gadolinium doped Cerium oxide/nickel nano composite film. The thickness of nanostructured anode composite film ranges from 20 μm to 40 μm. The nano gas channels 22 are nano-scaled channels for gas with diameter raning from 8 nm to 30 nm that enable gas such as hydrogen, or water vapor to flow and distribute more uniformly. Moreover, they can also increase numbers of the Three-Phase Boundaries (TPB) and improves the electrochemical activity of the anode. Thus the polarization resistance of the anode is reduced. Comparing with micron nickel particles, nano nickel particles are more packed to each other, the ohm resistance of anode is also reduced. Therefore, the power loss is minimized. Both yttria stabilized zirconia and gadolinium-doped ceria are ceramic material. The nanostructured anode composite film with nano gas channels according to the present invention is made from metal/ceramic composite film.

Figure 2A:
FIG. 2A is a higher magnification SEM (scanning electron microscope) of an embodiment of YSZ/Ni composite film with nano gas channels according to the present invention.
Figure 2B:
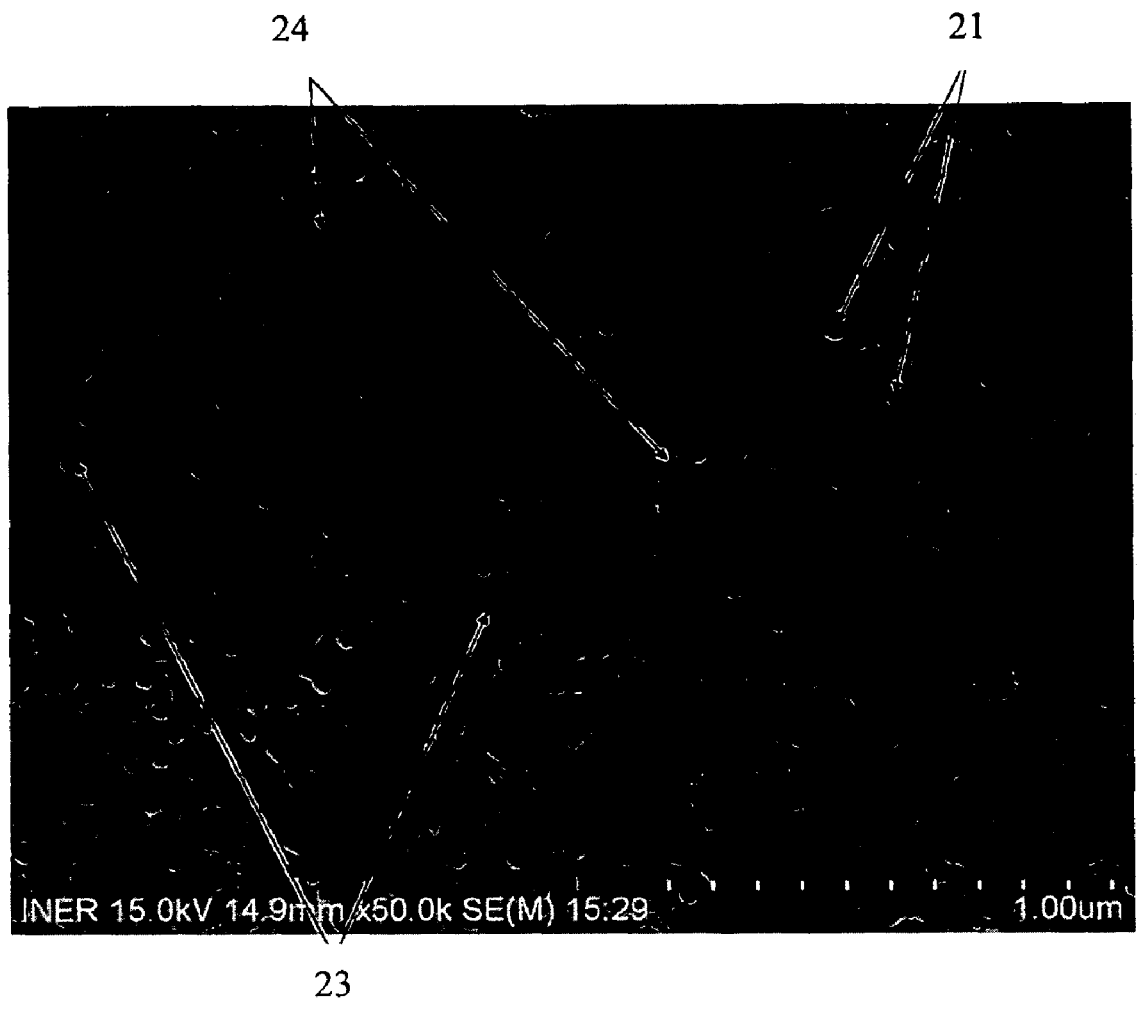
FIG. 2B is a lower magnification SEM (scanning electron microscope) of an embodiment of YSZ/Ni composite film with nano gas channels according to the present invention.
Figure 3A:
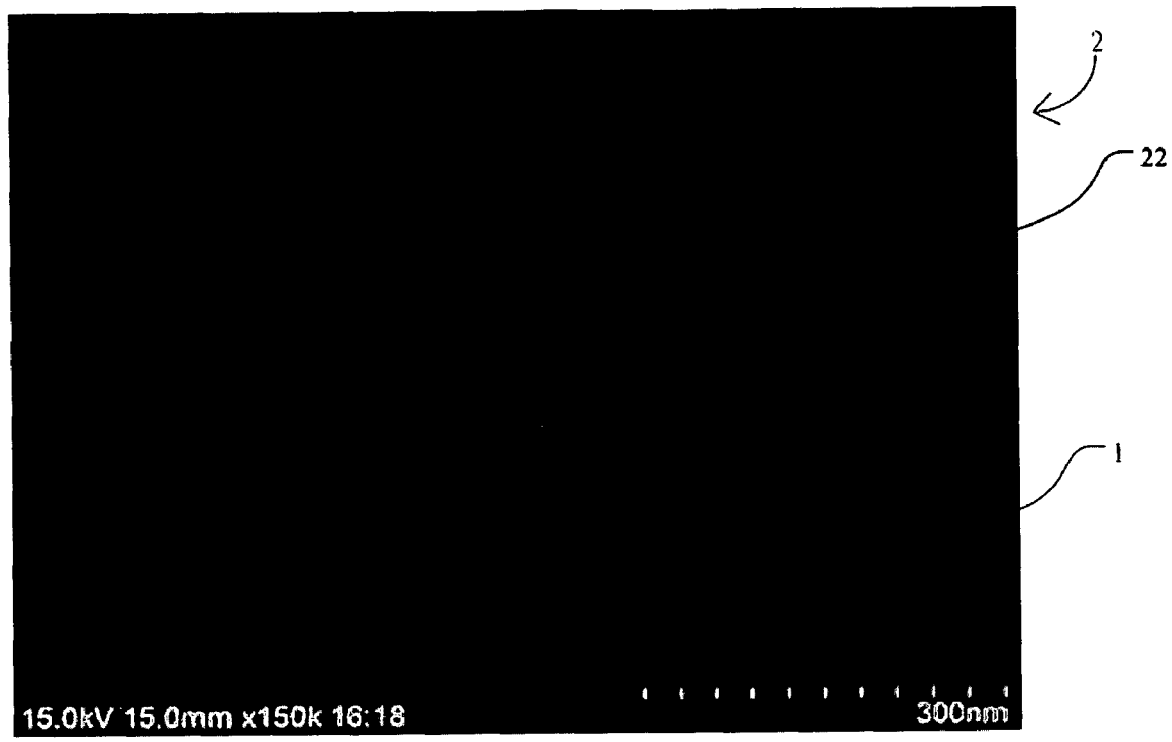
FIG. 3A is a SEM cross sectional view of an embodiment of a nanostructured YSZ/Ni anode composite film with nano gas channels according to the present invention.
Figure 3B:
FIG. 3B is a SEM cross sectional view of an embodiment of a nanostructured YSZ/Ni anode composite film with nano gas channels according to the present invention.

In an embodiment of the present invention, the porous base material is a microstructured porous YSZ/Ni composite material while the composite film with nano gas channels above the porous base material is YSZ/Ni nanostructured composite film. Refer to FIGS. 2A and 2B, a SEM surface morphology of YSZ/Ni nanostructured composite film with nano gas channels according to the present invention is disclosed. The area in black color is the nano gas pores 21 in the composite film, gray area is the nickel nano particles 23 and ash-colored area is YSZ 24. FIG. 3A and FIG. 3B are SEM (scanning electron microscope) cross sectional views respectively showing an embodiment of the nanostructured anode composite film with nano gas channels according to the present invention. The porous base material 1 and the composite film having a plurality of nano gas channels 22 are shown clearly in the FIGS. 3A and 3B.

Figure 4:
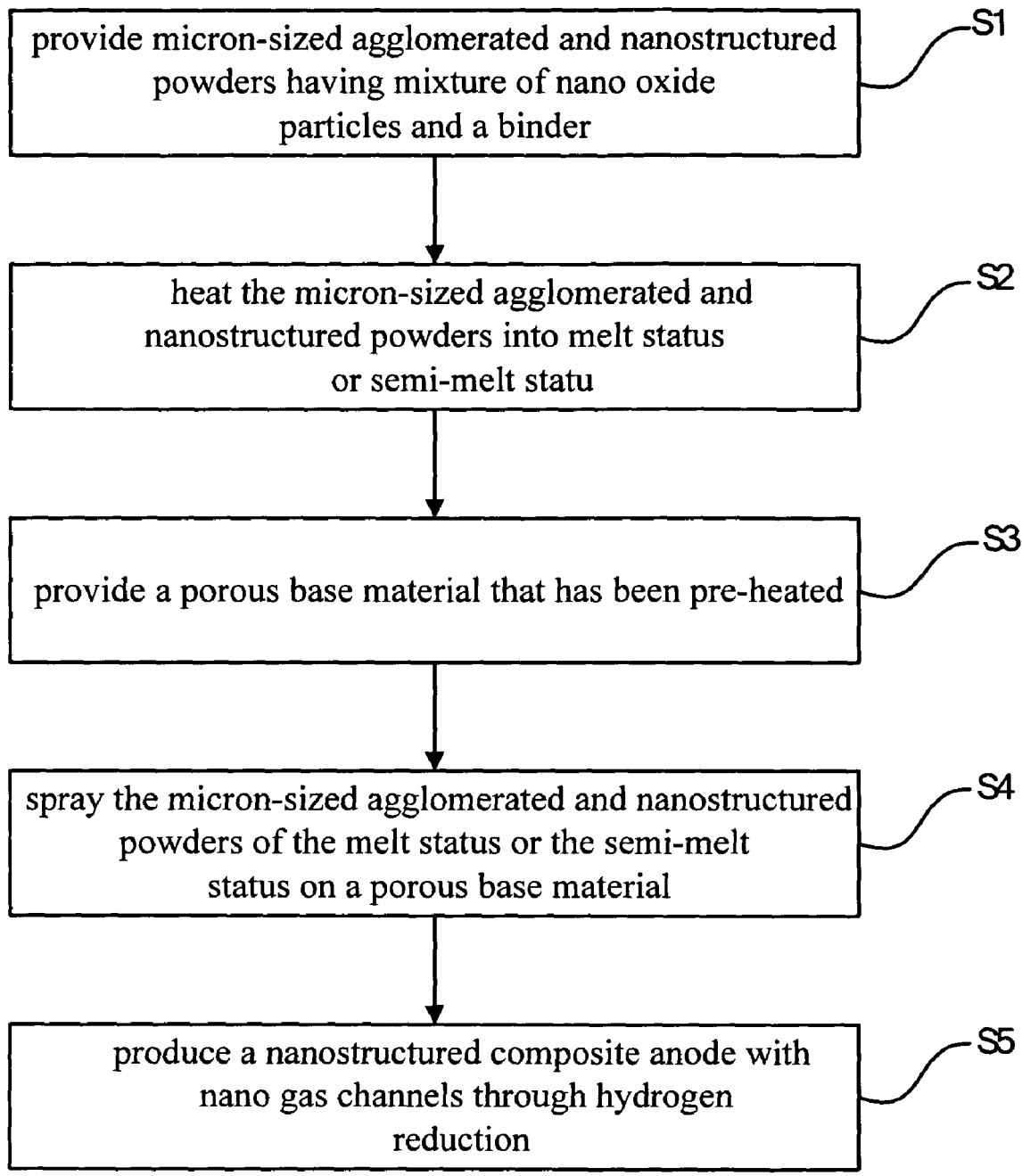
FIG. 4 is a flow chart of an atmosphere plasma spray manufacturing method for manufacturing a nanostructured anode composite film with nano gas channels according to the present invention.

Refer to FIG. 4, an atmosphere plasma spray manufacturing method of a nanostructured composite anode with nano gas channels according to the present invention consists of the following steps:

S1 provide micron-sized agglomerated and nanostructured powders having mixture of nano oxide particles and a binder;

S2 heat the micron-sized agglomerated and nanostructured powders into melt status or semi-melt statu;

S3 provide a porous base material that has been pre-heated;

S4 spray the micron-sized agglomerated and nanostructured powders of the melt status or the semi-melt status on a porous base material; and S5 produce a nanostructured composite anode with nano gas channels through hydrogen reduction The atmosphere plasma spray manufacturing method of a nanostructured composite anode with nano gas channels according to the present invention uses micron-sized agglomerated and nanostructured powders composed of nano-scaled oxide mixture and a binder as raw material while the high-temperature high-speed flame generated from the atmosphere plasma is used as a heating tool. The micron-sized agglomerated and nanostructured powders are sent into the high-temperature and high-speed flame by a powder feeder. By being heated, the binder in the micron-sized agglomerated and nanostructured powder is burned off and the mixture is dissolved into original nano oxide particles. The nano oxide particles is heated into melt or semi-melt status for being sprayed on the porous base material on the X-Y scanning machine to form a nanostructured composite film. Through hydrogen reduction with reaction time from 1 to 10 hours and temperature ranging from 500° C. to 800° C., the nanostructured composite anode for solid oxide fuel cells with nano gas pores and nano gas channels is generated.

The mixture of nano oxide particles is selected from nano yttria stabilized zirconia and nickel oxide mixture, or nano gadolinium-doped ceria and nickel oxide mixture, or nano scandium stabilized zirconia and nickel oxide mixture, or nano yttria stabilized zirconia and copper oxide mixture, or nano scandium stabilized zirconia and copper oxide mixture, or gadolinium-doped ceria and copper oxide mixture, or other nano anode material for solid oxide fuel cells and other nano metal oxide mixture. The diameter of the micron-sized agglomerated and nanostructured powder ranges from 1 to 100 μm while that of the nano oxide ingredient particles is no more than 100 nm. The binder is made from polyvinyl alcohol (PVA), organic adhesive or other glue-like material that is able to be burned off by the plasma flame. Moreover, the micron-sized agglomerated and nanostructured powder is added with material such as fine carbon powder or carbon fiber that is applied to increase porosity of the nanostructured anode composite film with nano gas channels.

Figure 5A:
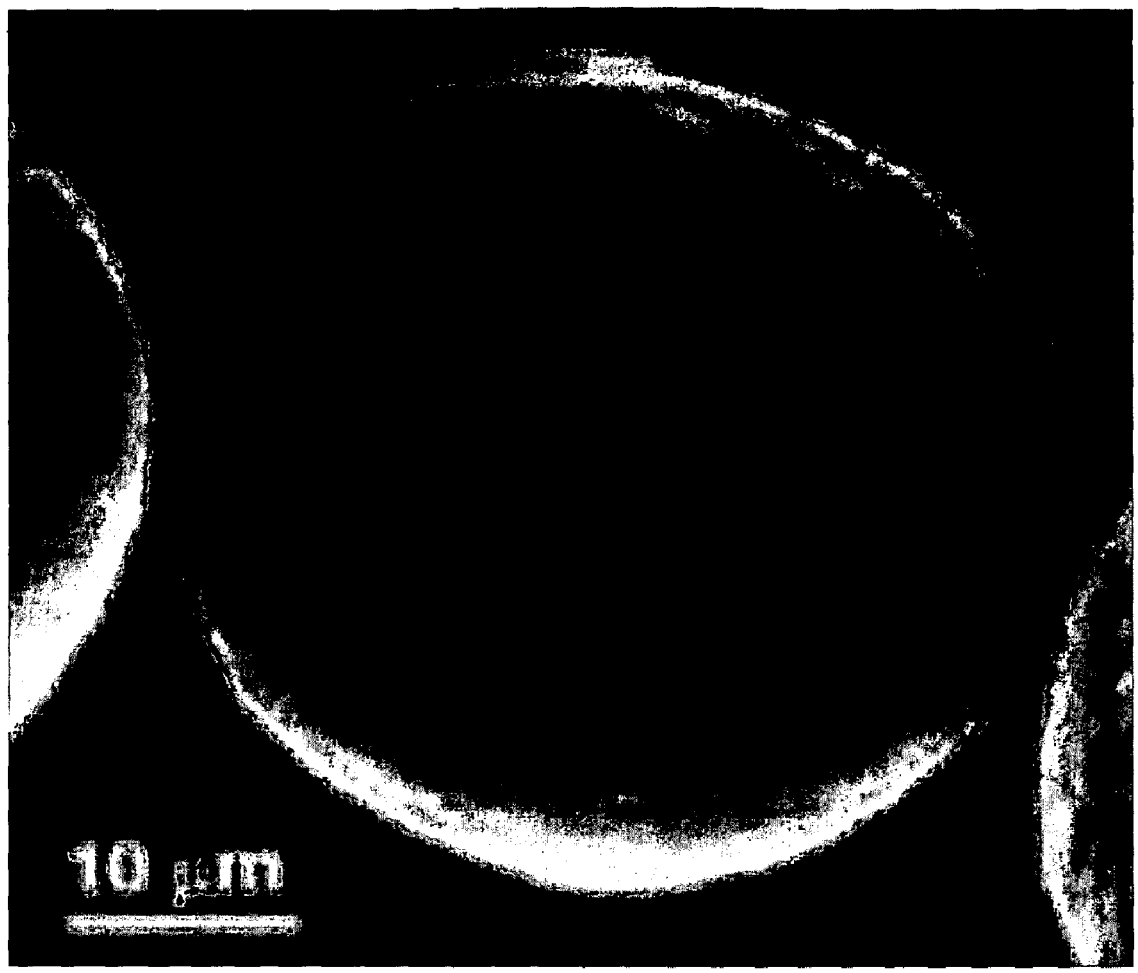
FIG. 5A is a SEM of an embodiment of micron-sized YSZ/NiO agglomerated and nanostructured powders according to the present invention.
Figure 5B:
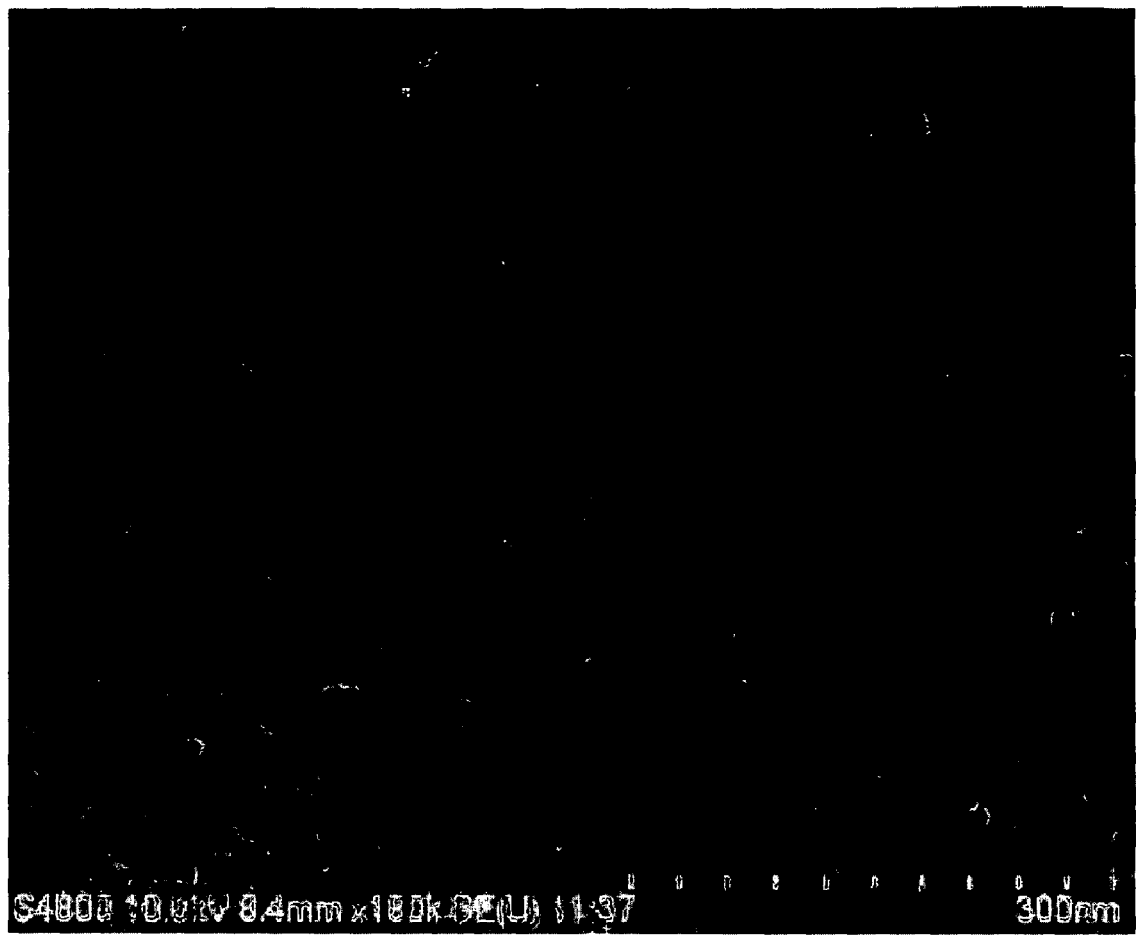
FIG. 5B is a SEM of an embodiment of YSZ and NiO nano particles of a micron-sized YSZ/NiO agglomerated and nanostructured powder according to the present invention.
Figure 6:
FIG. 6 is a SEM of an embodiment of nanostructured YSZ/NiO composite film according to the present invention.
Figure 7:
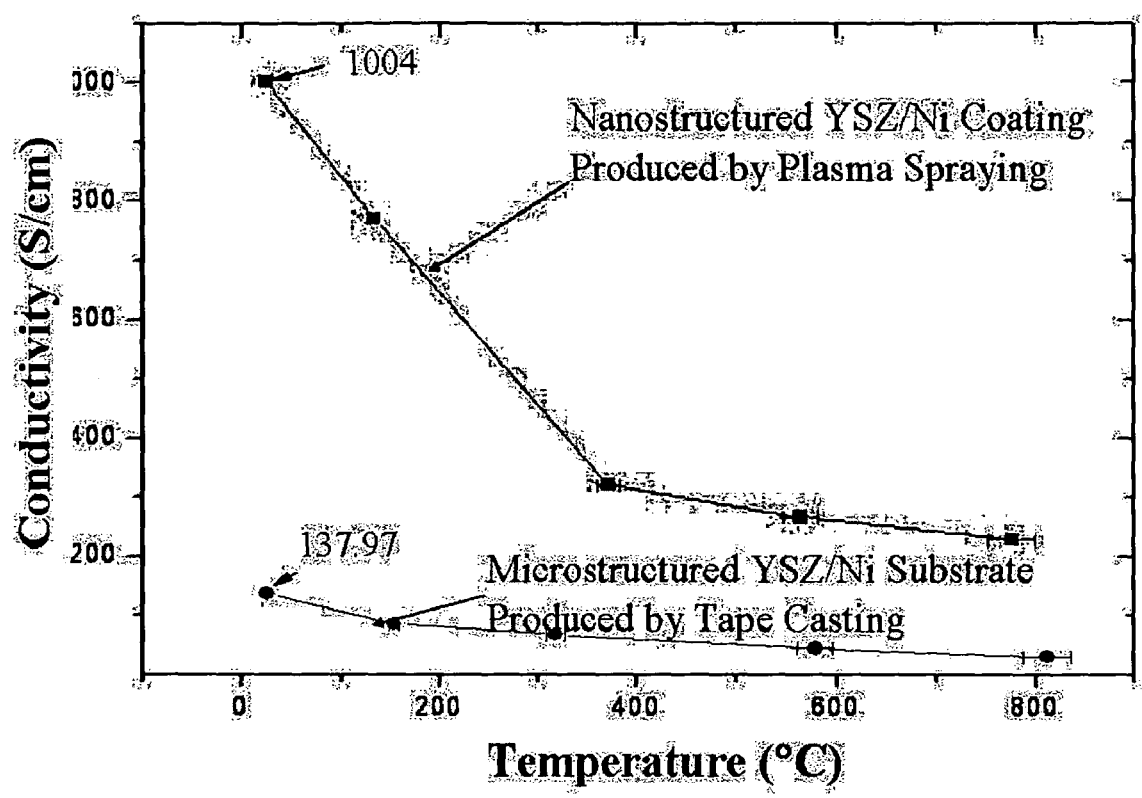
FIG. 7 shows conductivity versus temperature for nanostructured YSZ/Ni anode composite film with nano gas channels according to the present invention.
Figure 8:
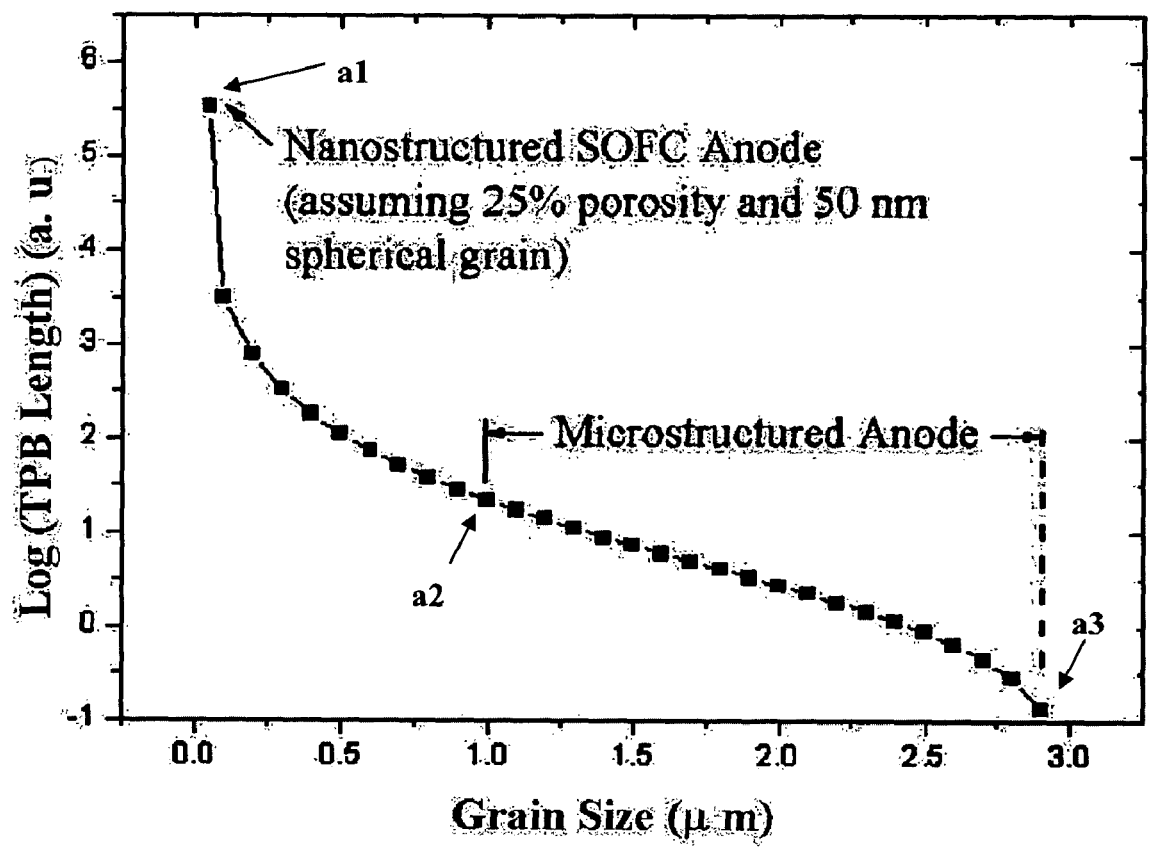
FIG. 8 shows logarithmic value of TPB (triple-phase-boundary) length versus particle size calculated from the model proposed by X. Deng and A. Petric according to the present invention.
Figure 9:
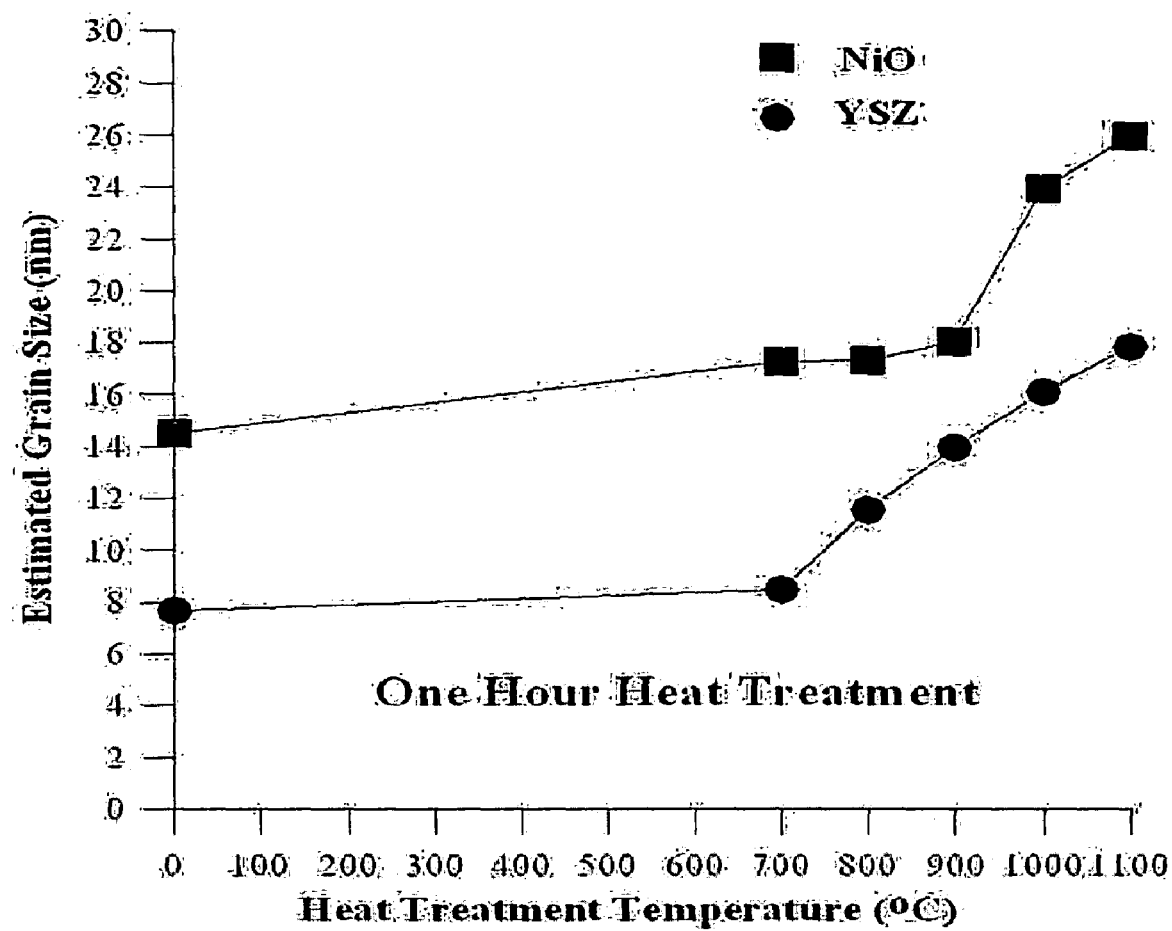
FIG. 9 shows YSZ/NiO particles size versus temperature for nanostructured YSZ/NiO composite film before hydrogen reduction according to the present invention.

Refer to FIG. 5A, micron-sized agglomerated and nanostructured powders are formed by mixture of the nano YSZ and nano nickel oxide (NiO) particles ($\leq 100$ nm). The particles of YSZ and nickel oxide are shown in FIG. 5B. Because nano particles have larger surface area to volume, they are easy to be heated into melt or semi-melt status by high temperature and high speed flame. Take the micron-sized agglomerated and nanostructured powders formed by a mixture of nano yttria stabilized zirconia and nano nickel oxide particles as an example. When the micron-sized agglomerated and nanostructured powder enters into the plasma flame, it is broken down into a plurality of nano yttria stabilized zirconia particles and nano nickel oxide particles. After being heated by the plasma flame, theses particles become melt or semi-melt and finally deposit on the porous base material to form a YSZ/NiO nanostructured composite film, as shown in FIG. 6. Under the environment of 800° C., 7% hydrogen gas and 93% argon gas for reduction, oxygen atoms of NiO in the composite film react with the hydrogen to generate water vapor. Thus the YSZ/Ni composite film with nano gas channels (as shown in FIG. 2A, FIG. 2B, FIG. 3A and FIG. 3B) is obtained. The nano gas channels provide hydrogen gas and water vapor the ways to flow and such nanostructured composite film with nano gas channels can be used as anode film for solid oxide fuel cells. The volume ratio of the YSZ to Ni is 50:50. The conductivity of the YSZ/Ni nanostructured composite film with nano gas channels formed by atmosphere plasma spraying is higher than that of the YSZ/Ni microstructured composite film formed by tape casting, as shown in FIG. 7. According to geometrical modeling of the triple-phase-boundary reported by the Xiaohua Deng and Anthony Petric (refer to Deng and Petric, "Geometrical modeling of the triple-phase-boundary in solid oxide fuel cells", *Journal of Power Source*, 140, 297, 2005), the calculated TPB length of YSZ/Ni anode composite film versus particle sizes of YSZ and Ni particles is shown in FIG. 8. The porosity of this YSZ/Ni anode composite film and particle sizes of YSZ and Ni particles are assumed to be 25% and 50 nm in this calculation. The point a1 in FIG. 8 gives the estimated logarithmic value of TPB length of this nanostructured YSZ/Ni anode composite film, while point a2, a3 respectively shows logarithmic values of TPB lengths of YSZ/Ni anode composite films with different particle sizes. The results show that the YSZ/Ni nanostructured anode composite film with nano gas channels has higher logarithmic value of TPB length that provides more reaction sites for hydrogen oxidation reaction. Refer to FIGS. 2A and 2B, YSZ particles (ash-colored area) form a network for conducting negative oxygen ions, nickel particles (gray area) form a network for conducting electrons. It looks like nano-scaled Ni particles are wrapped by the nanostructured YSZ network. In this intermixed YSZ and Ni networks, the growth of Ni grains at high temperatures is limited by YSZ network and the growth of YSZ grain at high temperatures is limited by Ni network. Take YSZ/NiO composite film as an example, FIG. 9 shows grain size of the YSZ as well as NiO is still less than 30 nm even after being heated up to 1100° C. for 1 hour.

Figure 10:
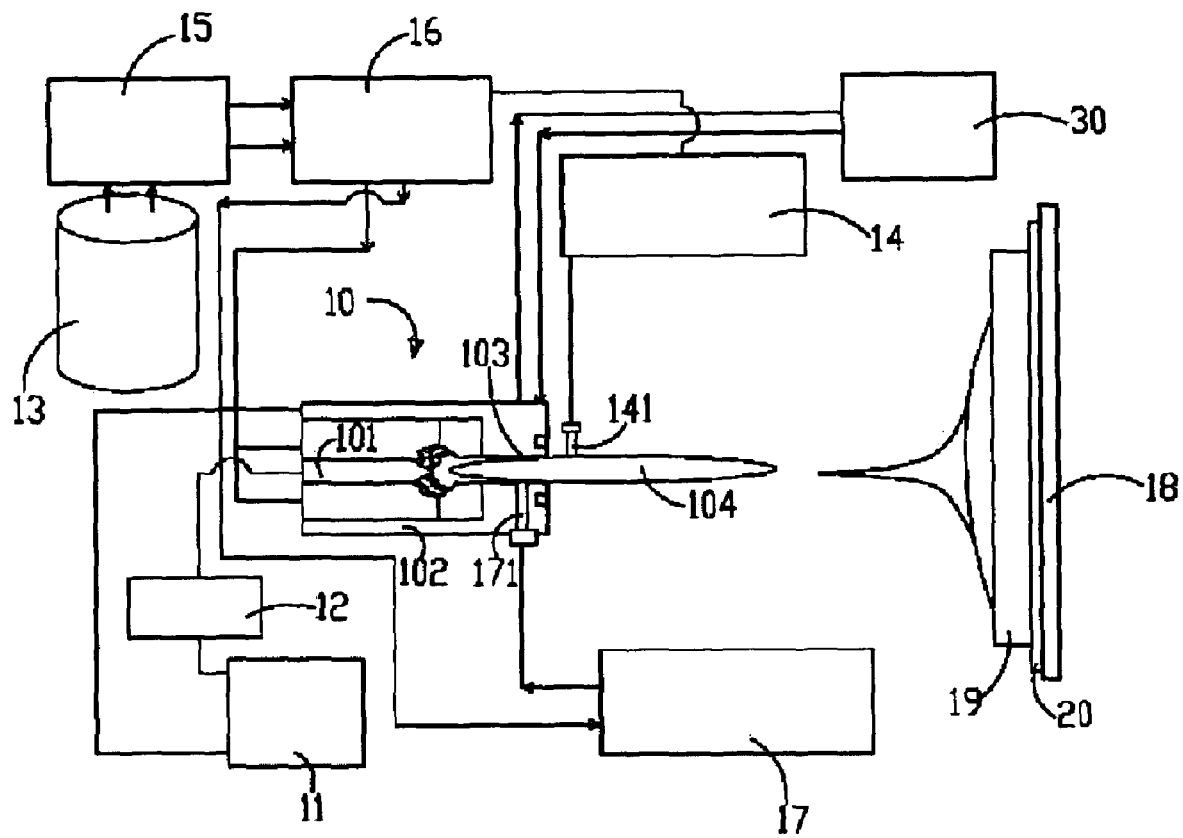
FIG. 10 is a schematic drawing showing an atmosphere plasma spray system according to the present invention.

Refer to FIG. 10, an atmosphere plasma spray system of the present invention includes a plasma torch device 10 having a thoriated tungsten cathode 101, a copper anode 102 and a torch exit nozzle 103 for blowing a plasma frame 104, a power source 11 connecting the thoriated tungsten cathode 101 and the copper anode 102, a igniter 12 with two sides respectively connecting to the power source 11 and the thoriated tungsten cathode 101; a gas cylinder 13 connecting to a first powder feeder 14 for transporting the micron-sized agglomerated and nanostructured powders to the torch exit nozzle 103; a gas pressure regulator 15 and a mass flow controller 16 disposed between the gas cylinder 13 and the first powder feeder 14 for adjusting gas pressure and flow. The gas cylinder 13 is further connected to a second powder feeder 17 while the gas pressure regulator 15 and the mass flow controller 16 disposed between the gas cylinder 13 and the second powder feeder 17. A first powder injector 141 is arranged on outer side of the torch exit nozzle 103 and is connected to the first powder feeder 14 for transporting the micron-sized agglomerated and nanostructured powders by injecting powders from outside. A second powder injector 171 is arranged on inner side of the torch exit nozzle 103 and is connected to the second powder feeder 17 for transporting the micron-sized agglomerated and nanostructured powders by injecting powder from inside. A X-Y scanning machine 18 is used in combination with the plasma flame 104 to adjust and scan position of a porous base material 19 there above. A heater 20 installed between the porous base material 19 and the X-Y scanning machine 18 is for pre-heating the porous base material 19. The plasma torch device 10 is further connected to a water cooling system 30 for reducing the temperature of the plasma torch device 10 and avoid damages caused by heat.

The plasma torch device uses a direct current power source. By means of electric arc between the thoriated tungsten cathode and the copper anode, gas passing between the cathode and the anode is heated into high temperature and high-speed flame. The gas can be pure argon gas, argon-hydrogen mixture, argon-helium mixture, or argon-nitrogen mixture. Argon gas flow rate ranges from 38 to 80 slpm (Standard Liters Per Minute) while hydrogen gas flow rate ranges from 4 to 20 slpm and helium gas flow rate ranges from 8 to 40 slpm. As to the plasma torch device, the operating current ranges from 400 to 900 A, the operation voltage ranges from 38 to 70 V, the operating power ranges from 20 to 40 kW. The distance between the torch exit nozzle and the porous base material is from 6 to 15 cm. The scanning speed of the X-Y machine ranges from 300 to 3000 cm/min. The machine can firstly scan in the X-direction and then the Y-direction or vice versa. Each point on the porous base material can be scanned by the X-Y machine and the scanning speed depends on thickness of the membrane deposited so as to obtain a composite film with relatively uniform thickness. The preheating temperature of the porous base material ranges from 200° C. to 700° C. while the feed rate of the micron-sized agglomerated and nanostructured powders is from 1 g/min to 10 g/min.

Figure 11:
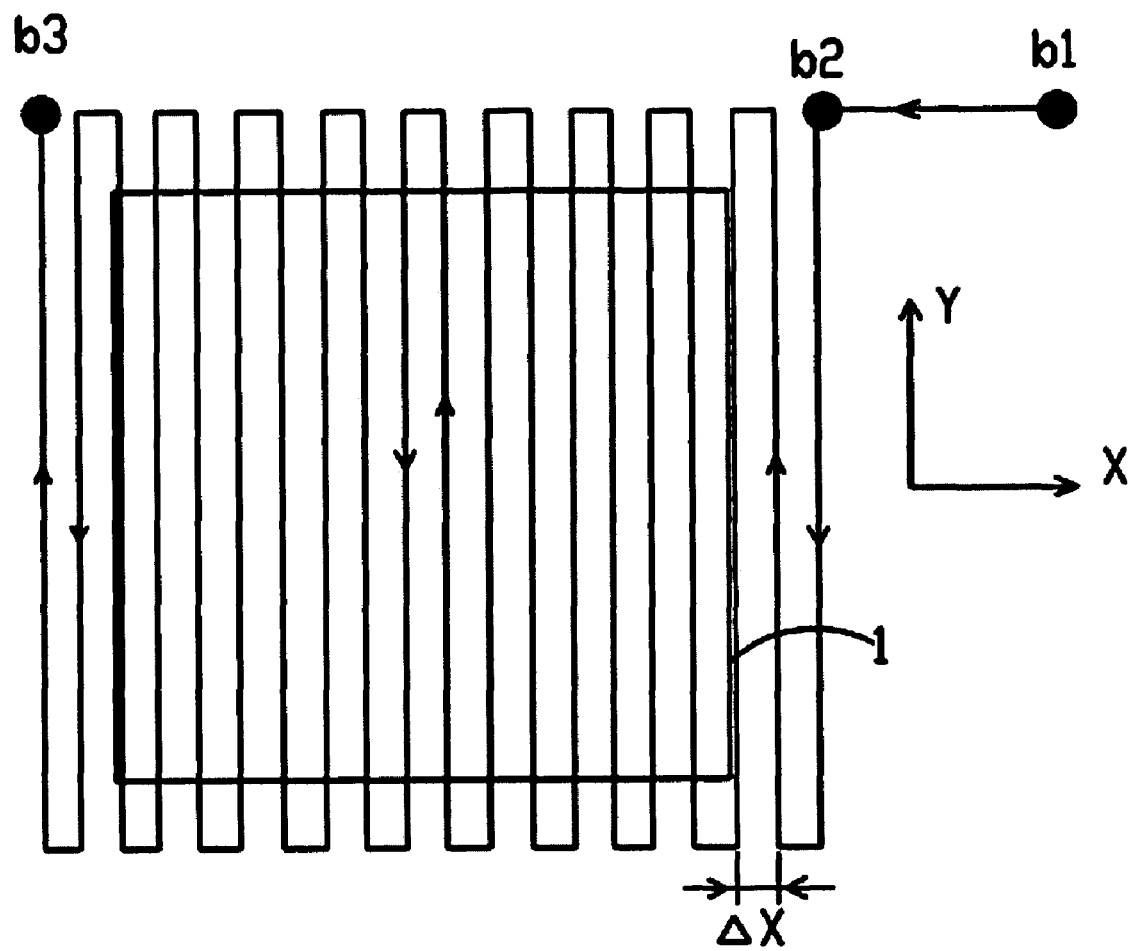
FIG. 11 shows scanning track of a X-Y scanning machine of an embodiment according to the present invention.

In a preferred embodiment of the present invention, while the atmosphere plasma spay system produces the YSZ/Ni nanostructured anode composite film with nano gas channels, the argon gas flow rate is preferably from 41~45 slpm, the hydrogen gas flow rate is from 8~12 slpm in atmospheric environment while the optimum operating current of the plasma torch device is 420A, the operation voltage is 62 V and the operating power is 26 kW. The distance between the torch exit nozzle and the porous base material is 9 cm and the model of powder feeder being used is Praxair 1264. The diameters of the YSZ/NiO micron-sized agglomerated and nanostructured powders being transported range from 1 µm to 100 µm and the feeding rate is 2~5 g/min. The YSZ/NiO micron-sized agglomerated and nanostructured powder consists of 8 mol % YSZ particles with diameter from 40~60 nm, nickel oxide particles with diameter from 20~50 nm and polyvinyl alcohol binder. The YSZ/NiO micron-sized agglomerated and nanostructured powders are sent into plasma torch on the position that is about 2 cm above the torch exit nozzle by injecting powder from inside. When spraying, the plasma torch is fixed and the linear movement speed of the X-Y machine in the X-direction as well as in the Y-direction is adjustable. The linear movement speed ranges from 400 to 1000 cm/min. The scanning range in both X-direction and Y-direction is also adjustable and the maximum is 15 cm. A typical scanning track is shown in FIG. 11, wherein the number 1 represents YSZ/Ni micron porous base material, b1 is a test point, b2 is initial point of scanning and b3 is turning point of scanning. ΔX is a gap (distance) moving in the X-direction from 3~5 mm. The planar scanning speed depends on thickness of the deposited film. When the linear movement speed in X and Y-direction is 500 cm/min, the YSZ/NiO composite film with 20~30 µm thickness needs only 6 to 10 times of planar scanning at the powder feed rate of 2 g/min. The YSZ/NiO nanostructured composite film formed according to above parameters is shown in FIG. 6.

Figure 12A:
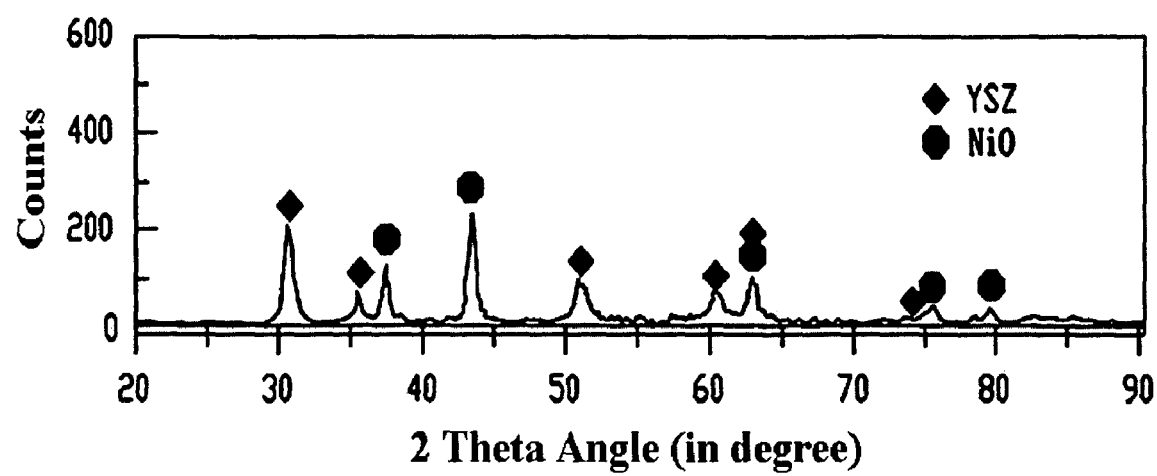
FIG. 12A shows XRD (X-ray Diffraction) pattern of the nanostructured YSZ/NiO composite film before being reduced by hydrogen.
Figure 12B:
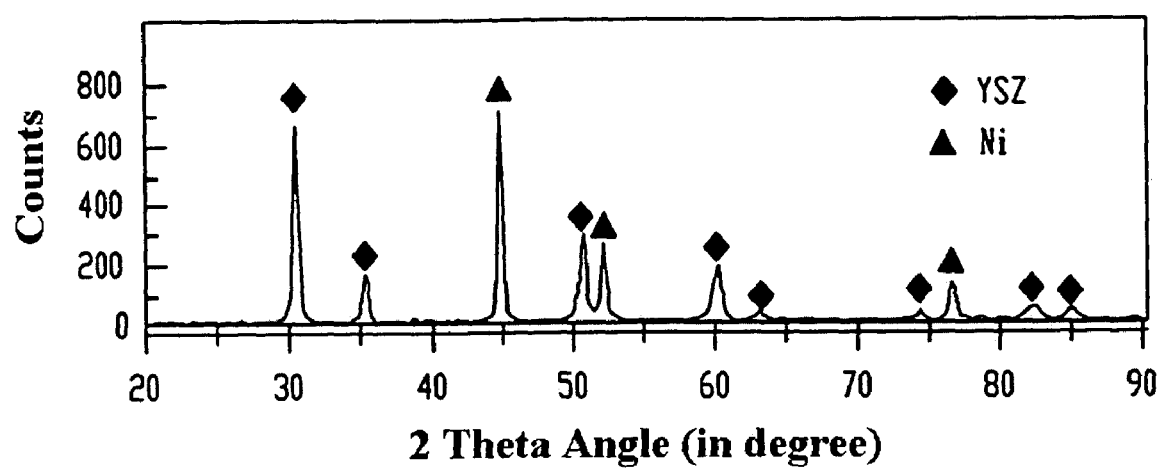
FIG. 12B shows XRD pattern of the nanostructured YSZ/Ni composite film after being reduced by hydrogen.

The YSZ/NiO nanostructured composite film is set inside a 800° C. furnace that is filled with 7% hydrogen gas and 93% argon gas for reduction. After 3~4 hours, YSZ/Ni nanostructured anode composite film in the FIG. 2A and FIG. 2B, FIG. 3A and FIG. 3B having nano gas channels, nano gas pores, nano nickel particles and nano YSZ particles are formed. Refer to FIG. 12A, it shows XRD (X-ray Diffraction) of the YSZ/NiO nanostructured composite film before being reduced by hydrogen while FIG. 12B shows the YSZ/Ni nanostructured composite film already being reduced by hydrogen, the nickel oxide has been reduced into nickel.

In summary, a nanostructured composite anode with nano gas channels and an atmosphere plasma spray manufacturing method thereof according to the present invention increase the anode TPB length of solid oxide fuel cells and provide more area for chemical reactions so that the electrochemical activity and the conductivity of anode are increased and the anode resistance is reduced. Thus the energy loss of the solid oxide fuel cells is reduced while the Ni particle aggregation effect on increasing anode resistance to an unfavorable condition under high temperature environment is slowed down. Therefore, the lifetime of the anode is increased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A nanostructured composite anode with nano gas channels comprising
   a porous base material; and
   a nanostructured anode composite film being disposed over the porous base material, said nanostructured anode composite film having a plurality of nano-gas pores disposed on one side thereof and a plurality of nano gas channels disposed therein, said plurality of nano gas pores connecting with said plurality of nano gas channels respectively, said plurality of nano gas channels having directions substantially perpendicular to the porous base material.

2. The nanostructured composite anode with nano gas channels as claimed in claim 1, wherein the porous base material is selected from the group consisting of porous micron yttria stabilized zirconia/nickel (YSZ/Ni) composite material, porous nickel, porous stainless steel, porous iron-nickel alloy and porous iron-chromium alloy.

3. The nanostructured composite anode with nano gas channels as claimed in claim 1, wherein the porous base material is a conductive and gas permeable base material.

4. The nanostructured composite anode with nano gas channels as claimed in claim 1, wherein thickness of the porous base material ranges from 0.5 mm to 2 mm.

5. The nanostructured composite anode with nano gas channels as claimed in claim 1, wherein material of the nanostructured anode composite film is made from the group consisting of yttria-stabilized zirconia/nickel nano composite powders and Gadolinium doped Cerium oxide/nickel nano composite powders.

6. The nanostructured composite anode with nano gas channels as claimed in claim 1, wherein diameter of the nano-gas channels ranges from 8 nm to 30 nm.

7. The nanostructured composite anode with nano gas channels as claimed in claim 1, wherein the thickness of nanostructured anode composite film ranges from 20 μm to 40 μm.

8. An atmosphere plasma spray manufacturing method for manufacturing a nanostructured composite anode with nano-gas channels comprising the steps of:
provided micron-sized agglomerated and nanostructured powders having a mixture of nano oxide particles and a binder;
heating the micron-sized agglomerated and nanostructured powders having a mixture of nano oxide particles and a binder into melt status or semi-melt status;
plasma spraying from a plasma torch the micron-sized agglomerated and nanostructured powders of the melt status or the semi-melt status on a porous base material to produce a nanostructured composite anode film over said porous base material; and
passing hydrogen through said porous base material and tunneling the nanostructured composite anode film to form a plurality of nano gas channels in the nanostructured composite anode film, said plurality of nano gas channels having directions substantially perpendicular to said porous base.

9. The manufacturing method as claimed in claim 8, wherein the material of the nano oxide particles are selected from the group consisting of yttria stabilized zirconia and nickel oxide mixture, gadolinium-doped ceria and nickel oxide mixture, scandium stabilized zirconia and nickel oxide mixture, nano-scaled anode materials for solid oxide fuel cells and nickel oxide mixture, yttria stabilized zirconia and copper oxide mixture, scandium stabilized zirconia and copper oxide mixture, gadolinium-doped ceria and copper oxide mixture and nano-scaled anode materials for solid oxide fuel cells and nano metal oxide particles mixture.

10. The manufacturing method as claimed in claim 8, wherein diameters of the micron-sized agglomerated and nanostructured powders range from 1 μm to 100 μm.

11. The manufacturing method as claimed in claim 8, wherein diameters of the nano oxide particles are no more than 100 nm.

12. The manufacturing method as claimed in claim 8, wherein the binder is selected from the group consisting of polyvinyl alcohol (PVA) and organic adhesive that is able to be burned off by plasma flame.

13. The manufacturing method as claimed in claim 8, wherein time of the hydrogen reduction ranges from 1 to 10 hours.

14. The manufacturing method as claimed in claim 8, wherein hydrogen reduction temperature varies from 500° C. to 800° C.

15. The manufacturing method as claimed in claim 8, wherein the step of hydrogen reduction uses argon-hydrogen mixture for reduction.

16. The manufacturing method as claimed in claim 8, wherein the operating current of plasma spray ranges from 400 to 900 A and the operation voltage of plasma spray ranges from 38 to 70V.

17. The manufacturing method as claimed in claim 8, wherein gas for the plasma spray is selected from the group consisting of argon gas, argon-hydrogen mixture, argon-helium mixture and argon-nitrogen mixture while argon gas flow rate ranges from 38 to 80 slpm (Standard Liters Per Minute), hydrogen gas flow rate ranges from 4 to 20 slpm and helium gas flow rate ranges from 8 to 40 slpm.

18. The manufacturing method as claimed in claim 8, wherein the plasma torch includes an exit nozzle and distance between the plasma torch exit nozzle and the porous base material is from 6 to 15 cm.

19. The manufacturing method as claimed in claim 8, wherein after the step of heating the micron-sized agglomerated and nanostructured powders into the melt status or the semi-melt status, the method further comprising a step of pre-heating the porous base material.

20. The manufacturing method as claimed in claim 8, wherein feed rate of the micron-sized agglomerated and nanostructured powders is from 1 g/min to 10 g/min.

21. The manufacturing method as claimed in claim 8, wherein scanning speed of a X-Y machine in the step of spraying ranges from 300 to 3000 cm/min and the X-Y scanning machine firstly scans in the X-direction and then the Y-direction or scans firstly in the Y-direction and then the X-direction.

22. The manufacturing method as claimed in claim 8 further comprising a porous material added into the micron-sized agglomerated and nanostructured powders and the porous material selected from the group consisting of fine carbon powder and carbon fiber that is used to increase the porosity of the nanostructured anode composite film with nano gas channels.

* * * * *